United States Patent
Tan

(10) Patent No.: US 10,831,059 B2
(45) Date of Patent: Nov. 10, 2020

(54) DISPLAY PANEL, DISPLAY APPARATUS AND METHOD OF CONTROLLING THE SAME

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/635,020

(22) PCT Filed: Jul. 19, 2019

(86) PCT No.: PCT/CN2019/096880
§ 371 (c)(1),
(2) Date: Jan. 29, 2020

(87) PCT Pub. No.: WO2020/015753
PCT Pub. Date: Jan. 23, 2020

(65) Prior Publication Data
US 2020/0241344 A1  Jul. 30, 2020

(30) Foreign Application Priority Data

Jul. 20, 2018 (CN) .......................... 2018 1 0805498

(51) Int. Cl.
*G02F 1/1335* (2006.01)
*G02F 1/1337* (2006.01)
*G02F 1/1343* (2006.01)

(52) U.S. Cl.
CPC ...... *G02F 1/133553* (2013.01); *G02F 1/1337* (2013.01); *G02F 1/13439* (2013.01); *G02F 1/133504* (2013.01); *G02F 1/133524* (2013.01)

(58) Field of Classification Search
None
See application file for complete search history.

(56) References Cited

U.S. PATENT DOCUMENTS 10,534,209 B1 * 1/2020 Fu .................. G02F 1/1326
2014/0286045 A1   9/2014 Pao et al.
(Continued)

FOREIGN PATENT DOCUMENTS

CN  103293744 A  9/2013
CN  104064118 A  9/2014
(Continued)

OTHER PUBLICATIONS

First Chinese Office Action issued in corresponding Chinese Application No. 201810805498.7, dated Aug. 10, 2020, with English language translation.

*Primary Examiner* — Phu Vu
(74) *Attorney, Agent, or Firm* — McDermott Will & Emery LLP

(57) ABSTRACT

A display panel, includes a liquid crystal layer, a first substrate and a second substrate disposed at opposite sides of the liquid crystal layer, and a control electrode layer disposed above the first substrate. The control electrode layer is configured to receive electrical signals and control light incident into the liquid crystal layer to propagate through total reflection, and to drive liquid crystal molecules in the liquid crystal layer to form a liquid crystal grating to make totally-reflected light in the liquid crystal layer coupled out at a side of the first substrate.

20 Claims, 6 Drawing Sheets

(56) References Cited

U.S. PATENT DOCUMENTS

| | | | |
|---|---|---|---|
| 2016/0154291 A1 | 6/2016 | Gibson et al. | |
| 2016/0342282 A1* | 11/2016 | Wassvik | G02F 1/13338 |
| 2018/0046052 A1* | 2/2018 | Ju | G02F 1/133707 |
| 2019/0033656 A1 | 1/2019 | Tan et al. | |

FOREIGN PATENT DOCUMENTS

| | | |
|---|---|---|
| CN | 108051962 A | 5/2018 |
| CN | 108227285 A | 6/2018 |

* cited by examiner

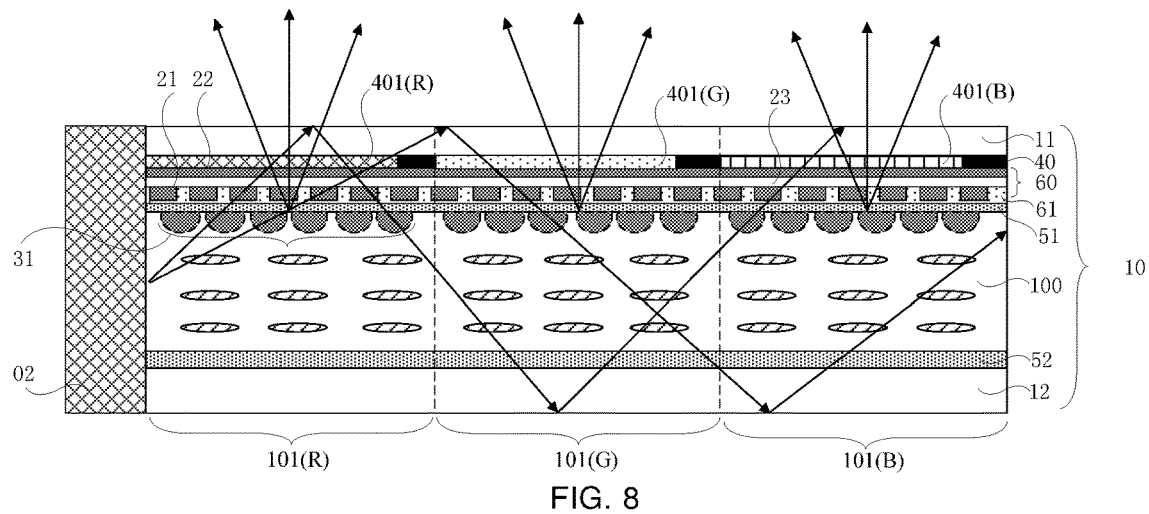

FIG. 8

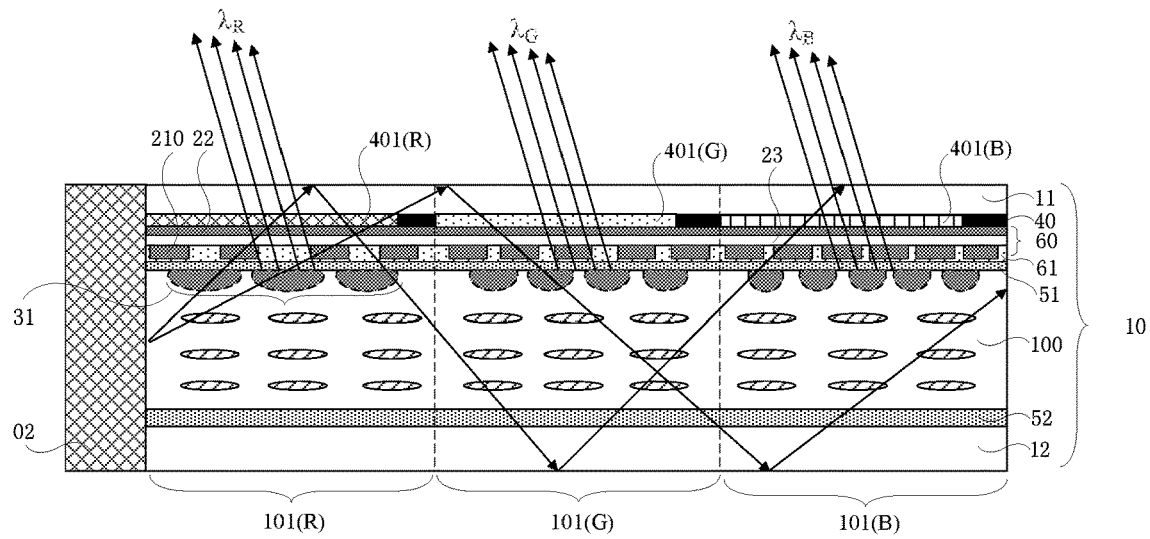

FIG. 9

| The light source is controlled to provide incident light to the liquid crystal layer, and a refraction angle of the incident light incident into the liquid crystal layer is in a range of ($\theta_0$-90°, 90°-$\theta_0$), where $\theta_0$ is a total reflection critical angle of a total reflection interface corresponding to the totally-reflected light fomed by the incident light in the liquid crystal layer | — S101 |
|---|---|
| Voltages are applied to the control electrode layer to control the incident light to propagate through total reflection in the liquid crystal layer, and to drive liquid crystal molecules in the liquid crystal layer to drive the liquid crystal molecules in the liquid crystal layer to form a liquid crystal grating to make the totally-reflected light in the liquid crystal layer coupled out at a side of the first substrate | — S102 |

DISPLAY PANEL, DISPLAY APPARATUS AND METHOD OF CONTROLLING THE SAME

CROSS-REFERENCE TO RELATED APPLICATIONS

This application is a national phase entry under 35 USC 371 of International Patent Application No. PCT/CN2019/096880 filed on Jul. 19, 2019, which claims priority to Chinese Patent Application No. 201810805498.7, filed with the Chinese Patent Office on Jul. 20, 2018, titled "A DISPLAY PANEL, DISPLAY APPARATUS AND METHOD OF CONTROLLING THE SAME", which are incorporated herein by reference in their entirety.

TECHNICAL FIELD

The present disclosure relates to the field of display technologies, and in particular, to a display panel, a display apparatus and a method of controlling the same.

BACKGROUND

With the continuous development of display technologies, display apparatuses such as thin film transistor liquid crystal displays (TFT-LCDs) are increasingly used in electronic equipment.

SUMMARY

In one aspect, a display panel is provided. The display panel includes a liquid crystal layer, a first substrate and a second substrate disposed at opposite sides of the liquid crystal layer, and a control electrode layer disposed above the first substrate. The control electrode layer is configured to receive electrical signals to control light incident into the liquid crystal layer to propagate through total reflection, and to drive liquid crystal molecules in the liquid crystal layer to form a liquid crystal grating to make totally-reflected light in the liquid crystal layer coupled out at a side of the first substrate.

In some embodiments, the control electrode layer includes a plurality of first electrodes and a plurality of second electrodes, and the plurality of first electrodes and the plurality of second electrodes are insulated from each other. The display panel further includes a plurality of sub-pixels arranged in an array. One first electrode is correspondingly provided in each sub-pixel. Each first electrode includes a plurality of first sub-electrodes spaced apart and electrically connected.

In some embodiments, one second electrode is correspondingly provided in each sub-pixel. Each second electrode includes a plurality of second sub-electrodes spaced apart and electrically connected. In a same sub-pixel, one second sub-electrode and one first sub-electrode are spaced apart from each other in a direction parallel to the first substrate.

In some embodiments, the plurality of sub-pixels include sub-pixels configured to be able to emit monochromatic lights with different wavelengths. A wavelength of monochromatic light that each sub-pixel is able to emit is inversely proportional to a number of first sub-electrodes in the sub-pixel.

In some embodiments, the sub-pixels that configured to be able to emit monochromatic lights with different wavelengths include sub-pixels configured to be able to emit red light, sub-pixels configured to be able to emit green light, and sub-pixels configured to be able to emit blue light. A number of first sub-electrodes in each sub-pixel that is configured to be able to emit red light is less than a number of first sub-electrodes in each sub-pixel that is configured to be able to emit green light. The number of first sub-electrodes in each sub-pixel that is configured to be able to emit green light is less than a number of first sub-electrodes in each sub-pixel that is configured to be able to emit blue light.

In some embodiments, the display panel further includes an insulating planarization layer disposed at a side of the control electrode layer proximate to the liquid crystal layer. A refractive index of a material of the insulating planarization layer is equal to a refractive index of a material of the control electrode layer, and a shape of the insulating planarization layer is complementary to a shape of the control electrode layer so that a surface of the insulating planarization layer proximate to the liquid crystal layer is flat.

In some embodiments, the display panel further includes: a first alignment layer disposed above the first substrate and located at a side of the insulating planarization layer proximate to the liquid crystal layer; and a second alignment layer disposed above the second substrate.

In some embodiments, one total reflection interface corresponding to the totally-reflected light is between the liquid crystal layer and the first substrate, and another total reflection interface corresponding to the totally-reflected light is between the liquid crystal layer and the second substrate.

In some embodiments, one total reflection interface corresponding to the totally-reflected light is between the liquid crystal layer and the insulating planarization layer, and another total reflection interface corresponding to the totally-reflected light is between the liquid crystal layer and the second substrate.

In some embodiments, one total reflection interface corresponding to the totally-reflected light is at a side of the first substrate away from the liquid crystal layer, and another total reflection interface corresponding to the totally-reflected light is at a side of the second substrate away from the liquid crystal layer.

In some embodiments, the display panel further includes a color filter layer disposed above the first substrate and located at a side of the control electrode layer away from the liquid crystal layer.

In another aspect, a display apparatus is provided. The display apparatus includes a light source and the display panel as described above. The light source is disposed at a light incident surface of the display panel parallel to a thickness direction. The light source is configured to provide incident light incident into the liquid crystal layer, and a refraction angle of the incident light incident into the liquid crystal layer is in a range of $(\theta_0-90°, 90°-\theta_0)$, where $\theta_0$ is a total reflection critical angle of a total reflection interface corresponding to the totally-reflected light formed by the incident light.

In some embodiments, the display apparatus further includes a transparent cover plate disposed at a light-emitting side of the display panel. An air buffer is disposed between the transparent cover plate and the first substrate in the display panel.

In some embodiments, the light source includes at least three types of monochromatic sub-light sources with different colors.

In some embodiments, the light source is a white light source. The display panel includes a plurality of sub-pixels with different colors. The liquid crystal grating in the display panel includes a plurality of liquid crystal sub-gratings. The plurality of liquid crystal sub-gratings are in one-to-one correspondence with the plurality of sub-pixels. A wavelength λ of light that each sub-pixel is able to emit satisfies the following formula:

$$n_1 \sin \theta_e - n_2 \sin \theta_2 = m \times \lambda / \Lambda,$$

where $\theta_1$ is an incident angle at which the totally-reflected light is incident onto a corresponding total reflection interface; $n_1$ is a refractive index of an optically denser medium corresponding to the total reflection interface; $n_2$ is a refractive index of an optically thinner medium corresponding to the total reflection interface, and $n_1$ is greater than $n_2$; m is a diffraction order of a liquid crystal sub-grating corresponding to each sub-pixel; Λ is a period of the liquid crystal sub-grating corresponding to each sub-pixel; and $\theta_2$ is a light-emitting angle corresponding to each sub-pixel.

In yet another aspect, a method of controlling the display apparatus is provided. The method of controlling the display apparatus includes: controlling the light source to provide incident light incident into the liquid crystal layer, and a refraction angle of the incident light incident into the liquid crystal layer in a range of ($\theta_0$-90°, 90°-$\theta_0$), where $\theta_0$ is a total reflection critical angle of a total reflection interface corresponding to the totally-reflected light formed by the incident light; and applying electrical signals to the control electrode layer to control the incident light to propagate in the liquid crystal layer through total reflection, and to drive the liquid crystal molecules in the liquid crystal layer to form a liquid crystal grating to make the totally-reflected light in the liquid crystal layer coupled out at a side of the first substrate.

In some embodiments, the display panel includes a plurality of sub-pixels arranged in an array, and the control electrode layer includes a plurality of first electrodes, each of which is located in a corresponding sub-pixel. The liquid crystal grating includes a plurality of liquid crystal sub-gratings in one-to-one correspondence with the plurality of sub-pixels. The step of forming a liquid crystal grating to make the totally-reflected light in the liquid crystal layer coupled out at a side of the first substrate, further includes: applying an electrical signal to each first electrode to control a light intensity of diffracted light of a liquid crystal sub-grating corresponding to each sub-pixel to be 0.1% to 20% of a light intensity of the incident light.

In some embodiments, the light source includes a plurality of monochrome sub-light sources with different colors, and the display panel includes a plurality of sub-pixels. The step of controlling the light source to provide incident light to the liquid crystal layer, further includes: in a time of a single frame, controlling the plurality of monochromatic sub-light sources with different colors to sequentially emit monochromatic lights with different colors in a different time period. The step of making the totally-reflected light in the liquid crystal layer coupled out at a side of the first substrate, further includes: in a time of a single frame, controlling the monochromatic lights with different colors incident into the liquid crystal layer to be sequentially coupled out at a position of each sub-pixel.

In some embodiments, in the time of a single frame, all the monochromatic light in the monochromatic light with different colors have a same light-emitting duration.

In yet another aspect, a non-transitory computer-readable storage medium is provided. The non-transitory computer-readable storage medium stores computer instructions that are configured to execute the method as described above.

In yet another aspect, a computer product is provided. The computer product includes a processor, a memory, and a computer program that is stored in the memory and is operable in the processor. When the processor runs the computer program, the computer product executes the method as described above.

In yet another aspect, a computer program is provided. When the computer program is loaded into a processor, the processor is caused to perform the method as described above.

BRIEF DESCRIPTION OF THE DRAWINGS

In order to describe technical solutions in embodiments of the present disclosure more clearly, the accompanying drawings to be used in the description of disclosure will be introduced briefly. Obviously, the accompanying drawings to be described below are merely some embodiments of the present disclosure, and a person of ordinary skill in the art can obtain other drawings according to these drawings without paying any creative effort.

FIG. 8 is a schematic diagram of a display apparatus achieving color display, according to some embodiments of the present disclosure;

FIG. 9 is a schematic diagram of another display apparatus achieving color display, according to some embodiments of the present disclosure;

FIG. 10 is a flow diagram of a method of controlling a display apparatus, according to some embodiments of the present disclosure;

DETAILED DESCRIPTION

The technical solutions in some embodiments of the present disclosure will be described clearly and completely with reference to the accompanying drawings in some embodiments of the present disclosure. Obviously, the described embodiments are merely some but not all of embodiments of the present disclosure. All other embodiments made on the basis of some embodiments of the present disclosure by a person of ordinary skill in the art without paying any creative effort shall be included in the protection scope of the present disclosure.

Terms "first", "second" and "third" are used for descriptive purposes only and are not to be construed as indicating or implying the relative importance or implicitly indicating the number of indicated technical features. Thus, features defined as "first", "second" and "third" may explicitly or implicitly include one or more of the features. In the description of some embodiments of the present disclosure, "a plurality of" means two or more, unless otherwise specified.

Figure 1:
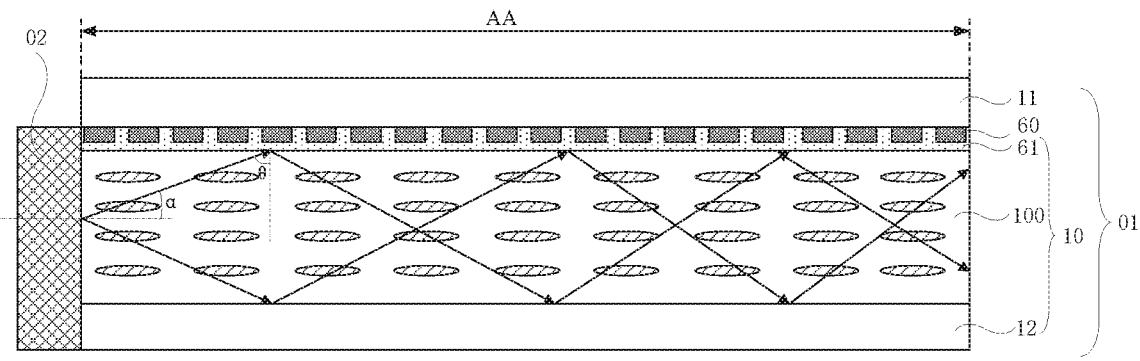
FIG. 1 is a schematic diagram of a display panel, according to some embodiments of the present disclosure.

Some embodiments of the present disclosure provide a display panel 01. As shown in FIG. 1, the display panel 01 has a display area AA. The display panel 01 includes a liquid crystal layer 100, a first substrate 11 and a second substrate 12 disposed at opposite sides of the liquid crystal layer 100, and a control electrode layer 60 disposed at a side of the first substrate 11 proximate to the liquid crystal layer 100. The control electrode layer 60 is configured to receive electrical signals to control light incident into the liquid crystal layer 100 to propagate through total reflection, and drive liquid crystal molecules in the liquid crystal layer 100 to form a liquid crystal grating 30 to make totally-reflected light in the liquid crystal layer 100 coupled out at a side of the first substrate 11. For example, referring to FIG. 2, the liquid crystal grating 30 includes a plurality of grating strips spaced apart.

The light incident into the liquid crystal layer 100 propagates through total reflection, which means that at least part of layers in the display panel 01, including the liquid crystal layer 100, constitute an optical waveguide 10. For example, the whole display panel 01 is an optical waveguide 10, and the light incident into the liquid crystal layer 100 is totally reflected by taking surfaces of the first substrate 11 and the second substrate 12 away from the liquid crystal layer 100 as corresponding total reflection interfaces.

According to different electrical signals received by the control electrode layer 60, the control electrode layer 60 may correspondingly control the light incident into the liquid crystal layer 100 to propagate through the total reflection, or control liquid crystal molecules in the liquid crystal layer 100 of the display area AA to form a liquid crystal grating 30. By utilizing the liquid crystal grating 30, the totally-reflected light in the liquid crystal layer 100 is coupled out at a side of the first substrate 11.

For example, the electrical signals received by the control electrode layer 60 are invalid electrical signals (e.g., null signals), that is, the control electrode layer 60 cannot generate an electric field after receiving the invalid electrical signals. The light incident into the liquid crystal layer 100 may be totally reflected in the optical waveguide 10 where the liquid crystal layer 100 is located. Here, the liquid crystal layer 100 is a component of the optical waveguide 10, and the liquid crystal layer 100 is in a dark state without an electric field.

The electrical signals received by the control electrode layer 60 are effective electrical signals (e.g., a plurality of electrical signals with voltage differences), that is, the control electrode layer 60 generates a plurality of electric fields after receiving the effective electrical signals to form a liquid crystal grating 30 in the liquid crystal layer 100.

The light incident into the liquid crystal layer 100 is generally provided by a light source 02, and the light provided by the light source 02 may be totally reflected in the optical waveguide 10 where the liquid crystal layer 100 is located. For example, the optical waveguide 10 has a hexagonal structure, which includes an upper surface, a lower surface, and four side surfaces arranged perpendicular to the upper surface and the lower surface. The light source 02 is disposed at a side surface of the optical waveguide 10 such that the light incident from the light source 02 into the optical waveguide 10 enters from the side surface of the optical waveguide 10, and the side surface is a light incident surface of the optical waveguide 10.

Here, if $n_1$ and $n_2$ are refractive indexes of two adjacent layers of media forming a total reflection interface in the optical waveguide 10, and $n_1$ is greater than $n_2$ ($n_1 > n_2$), that is, $n_1$ is a refractive index of an optically denser medium corresponding to the total reflection interface and $n_2$ is a refractive index of an optically thinner medium corresponding to the total reflection interface, a total reflection critical angle $\theta_0$ of the total reflection interface in the optical waveguide 10 satisfies the following formula:

$$n_1 \sin\theta_0 = n_2 \sin 90°; \text{ that is, } \theta = \arcsin\left(\frac{n_2}{n_1}\right) \tag{1}$$

Therefore, the light provided by the light source 02 is totally reflected in the optical waveguide 10, and a refraction angle α of the incident light incident into the liquid crystal layer 100 is in a range of ($\theta_0$-90°, 90°-$\theta_0$), where $\theta_0$ is a total reflection critical angle of the total reflection surface in the optical waveguide 10. The angle θ in FIG. 1 is an actual total reflection angle, and the angle 9 is greater than the total reflection critical angle $\theta_0$.

Figure 2:
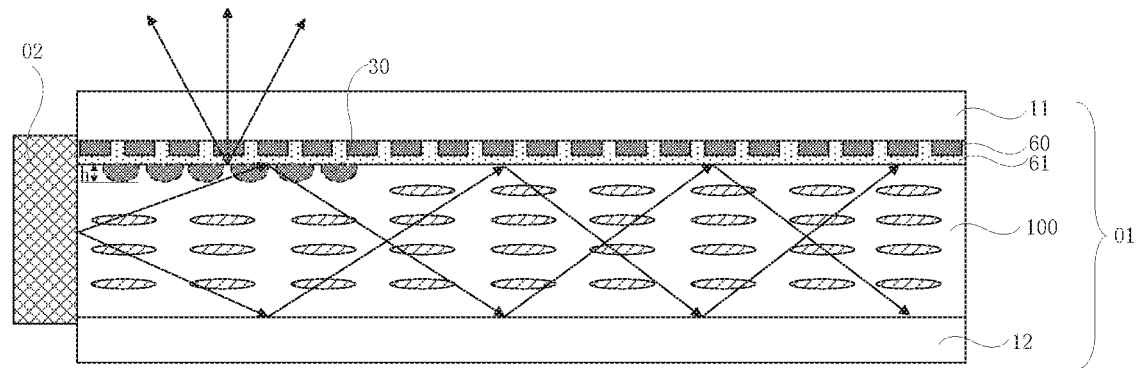
FIG. 2 is a schematic diagram showing propagation of light in an optical waveguide of the display panel shown in FIG. 1.

It will be noted that, with continued reference to FIG. 2, liquid crystal molecules in the liquid crystal layer 100 form a liquid crystal grating 30 under control of the control electrode layer 60, that is, the liquid crystal grating 30 is generally formed in a part of regions where the liquid crystal layer 100 is proximate to the control electrode layer 60, such that a height h of the liquid crystal grating 30 (i.e., a dimension in a thickness direction of the liquid crystal layer 100) is far less than a thickness of the liquid crystal layer 100. Therefore, the liquid crystal grating 30 controls the totally-reflected light in the liquid crystal layer 100 to be coupled out at a side of the first substrate 11. Only light that is refracted or reflected on a surface of the liquid crystal grating 30 parallel to the first substrate 11 is considered, and light that is refracted or reflected on other side surface of the liquid crystal grating is not considered.

In addition, a magnitude of an electric field generated by the control electrode layer 60 can be determined by an amount of voltage applied to the control electrode layer 60. The greater the electric field generated by the control electrode layer 60 is, the greater the height h of the liquid crystal grating 30 formed in the liquid crystal layer 100 under action of the electric field will be. And the greater the height h of the liquid crystal grating 30 is, the more light the liquid crystal grating 30 will diffract. Therefore, by applying different voltages to the control electrode layer 60, a multi-grayscale display of the display panel may be achieved.

Of course, in a case where no voltage is applied to the control electrode layer 60, that is, the control electrode layer 60 receives the invalid electrical signals, the liquid crystal grating 30 will not be formed in the liquid crystal layer 100, and the light incident into the liquid crystal layer 100 cannot be coupled out through the liquid crystal grating 30. In this case, if the refraction angle α of the light incident into the liquid crystal layer 100 satisfies the above angle range ($\theta_0$-90°, 90°-$\theta_0$), the light is totally reflected in the optical waveguide 10 where the liquid crystal layer 100 is located. In this case, the display panel 01 does not emit light and is in a dark state.

In some embodiments, with continued reference to FIG. 1, the display panel 01 further includes an insulating planarization layer 61 disposed at a side of the control electrode layer 60 proximate to the liquid crystal layer 100. A refractive index of the insulating planarization layer 61 is equal to a refractive index of a material of the control electrode layer 60, and a shape of the insulating planarization layer 61 is complementary to a shape of the control electrode layer 60 so that a surface of the insulating planarization layer 61 proximate to the liquid crystal layer 100 is flat.

Here, the surface of the insulating planarization layer 61 proximate to the liquid crystal layer 100 is flat, which means that a thickness H1 of the control electrode layer 60 plus a thickness H2 of a portion of the insulating planarization layer 61 that covers a corresponding surface of the the control electrode layer 60 is approximately equal to a thickness H3 of a portion of the insulating planarization layer 61 that does not cover the control electrode layer 60; that is, H1+H2≈H3, and a deviation between H3 and a sum of H1 and H2 is within ±5% (i.e., in a range of −5% to +5%).

The shape of the insulating planarization layer 61 is complementary to the shape of the control electrode layer 60, that is, a recessed position of the control electrode layer 60 exactly corresponds to a protruding position of the insulating planarization layer 61, and a protruding position of the control electrode layer 60 exactly corresponds to a recessed position of the insulating planarization layer 61. In addition, a material of the insulating planarization layer 61 has a same refractive index as a material of the control electrode layer 60. Therefore, it is possible to prevent the control electrode layer 60 from forming another grating structure in a case where the control electrode layer 60 includes a plurality of strip electrodes, and prevent affecting the liquid crystal grating 30 to couple out light.

Here, the material of the insulating planarization layer 61 has the same refractive index as the material of the control electrode layer 60, which means that the refractive index of the material of the insulating planarization layer 61 is completely equal to the refractive index of the material of the control electrode layer 60; or in a case where the influence of the insulating planarization layer 61 and the control electrode layer 60 on the light transmission direction cannot be distinguished by human eyes, the refractive index of the material of the insulating planarization layer 61 is approximately equal to the refractive index of the material of the control electrode layer 60.

Figure 3:
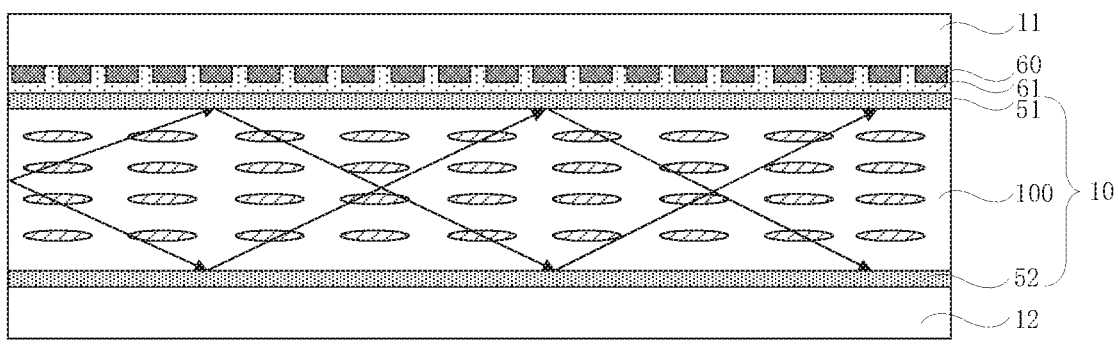
FIG. 3 is a schematic diagram of another display panel, according to some embodiments of the present disclosure.

In some embodiments, as shown in FIG. 3, the display panel 01 further includes: a first alignment layer 51 disposed above the first substrate 11 and located at a side of the insulating planarization layer 61 proximate to the liquid crystal layer 100; and a second alignment layer 52 disposed on the second substrate 12. The first alignment layer 51 and the second alignment layer 52 are generally located at opposite sides of the liquid crystal layer 100, and configured to define an initial deflection angle of the liquid crystal molecules in the liquid crystal layer 100.

In addition, in a case where the first alignment layer 51 directly covers the control electrode layer 60, a surface of the first alignment layer 51 facing away from the control electrode layer 60 is flat, and a refractive index of the first alignment layer 51 is equal or approximately equal to the refractive index of the material of the control electrode layer 60, the first alignment layer 51 may replace the insulating planarization layer 61 in some embodiments described above.

Hereinafter, a structure of the optical waveguide 10 will be described below.

In some embodiments, one total reflection interface corresponding to the totally-reflected light is between the liquid crystal layer 100 and the first substrate 11, and another total reflection interface corresponding to the totally-reflected light is between the liquid crystal layer 100 and the second substrate 12. That is, the optical waveguide 10 includes the liquid crystal layer 100 and layers adjacent to the liquid crystal layer 100.

For example, as shown in FIG. 1, the optical waveguide 10 includes the insulating planarization layer 61, the liquid crystal layer 100, and the second substrate 12. In this case, the layers adjacent to the liquid crystal layer 100 are the insulating planarization layer 61 and the second substrate 12. A contact surface between the liquid crystal layer 100 and the insulating planarization layer 61 and a contact surface between the liquid crystal layer 100 and the second substrate 12 are total reflection interfaces of the optical waveguide 10, i.e., the total reflection interfaces corresponding to the totally-reflected light in the liquid crystal layer 100.

In formula (1), $n_1$ is a refractive index of the liquid crystal layer 100, and $n_2$ is a refractive index of the insulating planarization layer 61 or the second substrate 12.

In some examples, the refractive index $n_1$ of the liquid crystal layer 100 is greater than the refractive index $n_2$ of the insulating planarization layer 61, that is, the liquid crystal layer 100 is an optically denser medium relative to the insulating planarization layer 61. In this way, the light incident from the light source 02 to the optical waveguide 10 may be totally reflected at an interface where the liquid crystal layer 100 and the insulating planarization layer 61 are in contact.

In some other examples, the refractive index $n_1$ of the liquid crystal layer 100 is greater than the refractive index $n_2$ of the second substrate 12, that is, the liquid crystal layer 100 is an optically denser medium relative to the second substrate 12. In this way, the light incident from the light source 02 to the optical waveguide 10 may be totally reflected at an interface where the liquid crystal layer 100 and the second substrate 12 are in contact.

In yet some other examples, the refractive index of the liquid crystal layer 100 is 2.0, the refractive index of the insulating planarization layer 61 is 1.8, and the refractive index of the second substrate 12 is 1.7. A total reflection critical angle $\theta_{01}$ of the total reflection interface between the liquid crystal layer 100 and the insulating planarization layer 61 is approximately 64.158°, and a total reflection critical angle $\theta_{02}$ of the total reflection interface between the liquid crystal layer 100 and the second substrate 12 is approximately 58.212°. Therefore, in the optical waveguide 10 composed of the insulating planarization layer 61, the liquid crystal layer 100, and the second substrate 12, its total reflection angle θ may be set to 64.16°.

There are two total reflection interfaces corresponding to the totally-reflected light in the optical waveguide 10. In a case where the total reflection critical angles of the two total reflection interfaces are different, the total reflection critical angle of the optical waveguide 10, that is, the total reflection critical angle of the total reflection interfaces corresponding to the totally-reflected light in the liquid crystal layer 100, is selected from the larger one of the total reflection critical angles of the two total reflection interfaces.

In addition, the liquid crystal grating 30 is configured to control the totally-reflected light in the liquid crystal layer 100 to be coupled out at a side of the first substrate 11. The refractive index of the insulating planarization layer 61 should be greater than or approximately equal to the refractive index of the second substrate 12. Of course, in some other examples, the display panel 01 further includes a reflective layer disposed at a side of the second substrate 12 away from the liquid crystal layer 100.

In some other embodiments, one total reflection interface corresponding to the totally-reflected light is between the liquid crystal layer 100 and the insulating planarization layer 61, and another total reflection interface corresponding to the totally-reflected light is between the liquid crystal layer 100 and the second substrate 12. That is, the optical waveguide 10 includes the liquid crystal layer 100 and layers adjacent to the liquid crystal layer 100.

For example, as shown in FIG. 3, in a case where the display panel 01 further includes the first alignment layer 51 and the second alignment layer 52, the layers adjacent to the liquid crystal layer 100 are the first alignment layer 51 and the second alignment layer 52. That is, the optical waveguide 10 includes the first alignment layer 51, the liquid crystal layer 100, and the second alignment layer 52. A contact surface between the liquid crystal layer 100 and the first alignment layer 51 and a contact surface between the liquid crystal layer 100 and the second alignment layer 52 are the total reflection interfaces of the optical waveguide 10.

In yet some other embodiments, one total reflection interface corresponding to the totally-reflected light is at a side of the first substrate 11 away from the liquid crystal layer 100, and another total reflection interface corresponding to the totally-reflected light is at a side of the second substrate 12 away from the liquid crystal layer 100. That is, the optical waveguide 10 includes the display panel 01 and layers adjacent to the display panel 01.

Figure 4:
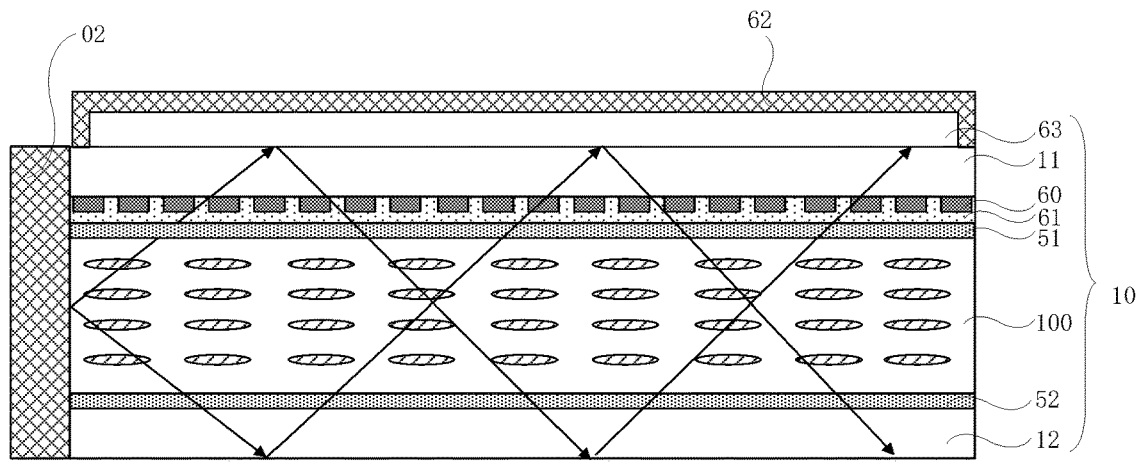
FIG. 4 is a schematic diagram of yet another display panel, according to some embodiments of the present disclosure.

For example, as shown in FIG. 4, the optical waveguide 10 includes the first substrate 11, the control electrode layer 60, the insulating planarization layer 61, the liquid crystal layer 100, the second substrate 12, and air buffer(s) 63 on surface(s) of at least one of the first substrate 11 or the second substrate 12 away from the liquid crystal layer 100. Here, the air buffer 63 is configured to cause the light incident into the optical waveguide 10 to be totally reflected at an interface where the first substrate 11 or the second substrate 12 is in contact with the air buffer 63.

In some examples, in a case where the display panel 01 further includes the first alignment layer 51 and the second alignment layer 52, the optical waveguide 10 further includes the first alignment layer 51 and the second alignment layer 52.

In some other examples, referring to FIG. 4, a transparent cover plate 62 is provided at a light-emitting side of the display panel 01. There is a certain space between the transparent cover plate 62 and the first substrate 11 through a support structure located in a non-display area. The space is filled with air. In this way, the air buffer 63 located on a surface of the first substrate 11 away from the liquid crystal layer 100 is formed of air located in the space.

Of course, in yet some other examples, side surfaces (referred to as outer surfaces) of the first substrate 11 and the second substrate 12 away from the liquid crystal layer 100 are in direct contact with air. In this way, the air buffers 63 located on surfaces of the first substrate 11 and the second substrate 12 away from the liquid crystal layer 100 are respectively formed of the air that is in contact with the outer surfaces of the first substrate 11 and the second substrate 12.

Based on this, the refractive index of the liquid crystal layer 100 is less than or equal to a refractive index of any one of the first alignment layer 51, the second alignment layer 52, the insulating planarization layer 61, the control electrode layer 60, the first substrate 11 and the second substrate 12. That is, The liquid crystal layer 100 is an optically thinner medium relative to the alignment layer 50, the insulating planarization layer 61, the control electrode layer 60, the first substrate 11 and the second substrate 12. In addition, the liquid crystal layer 100, the first alignment layer 51, the second alignment layer 52, the insulating planarization layer 61, the control electrode layer 60, the first substrate 11, and the second substrate 12 are optically denser medium relative to the air buffers 63.

For example, the liquid crystal layer 100 has a crystal birefringence phenomenon, and thus a refractive index $n_o$ of the liquid crystal layer 100 in an "ordinary light" state is equal to 1.52, and a refractive index $n_e$ of the liquid crystal layer 100 in an "extraordinary light" state is equal to 1.8. The first alignment layer 51 and the second alignment layer 52 are made of polyimide, the refractive index of which is 1.55. The control electrode layer 60 is made of indium tin oxide (ITO), the refractive index of which is 1.8. The insulating planarization layer 61 is made of SiNx, the refractive index of which is 1.8. Refractive indexes of the first substrate 11 and the second substrate 12 are 1.5. A refractive index of the air buffer 63 is 1. And, the total reflection angle θ of the optical waveguide 10 can be set to 42.07°.

It will be noted that, in the optical waveguides 10 described above, the refractive indexes of the first substrate 11 and the second substrate 12 may be the same or different, which is not limited in some embodiments of the present disclosure. For convenience of description, the following embodiments of the present disclosure are all described by taking as an example that a refractive index of the first substrate 11 are the same as a refractive index of the second substrate 12.

In summary, in one aspect, the light received in the optical waveguide 10 including the liquid crystal layer 100 of the display panel 01 is incident from a side surface of the optical waveguide 10 by the light source 02, and in a case where the liquid crystal grating 30 is formed in the liquid crystal layer 100, the liquid crystal grating 30 may couple out the light incident into the optical waveguide 10 from a side of the first substrate 11. Therefore, the display panel 01 may realize display without providing polarizers at the light incident side and the light-emitting side, that is, a selective transmission of light may be realized without using the polarizers. Thereby, problems of low light transmittance and poor reliability caused by providing polarizers at the light incident side and the light-emitting side of the display panel 01 may be solved.

In another aspect, during a grayscale display of the display panel 01, a liquid crystal grating 30 is formed in the liquid crystal layer 100 by applying voltages to the control electrode layer 60, and the display panel 01 may display different grayscales by adjusting a diffraction capability of the liquid crystal grating 30. Therefore, it is not necessary to manufacture additional grating strips in the liquid crystal layer 100. In this way, it is possible to prevent the grating strips from affecting an initial alignment of the liquid crystal molecules in the liquid crystal layer 100.

In yet another aspect, in a case where the display panel 01 is in a dark state, the light incident into the optical waveguide 10 including the liquid crystal layer 100 is totally reflected, and no light is emitted from the display panel 01, thereby solving the problem of light leakage of the display panel 01 in the dark state, which is beneficial to improving a contrast of a display image of the display panel 01. Therefore, as long as it is ensured that the refraction angle of the light incident from the light source 02 into the optical waveguide 10 satisfies a condition that the light is totally reflected in the optical waveguide 10, it can be ensured that the display panel 01 does not leak light in the dark state, thereby easily improving a productivity of the product.

In some embodiments, the control electrode layer 60 includes a plurality of first electrodes 21 and a plurality of second electrodes 22, and the plurality of first electrodes 21 and the plurality of second electrodes 22 are insulated from each other. That is, any first electrode 21 is insulated from any second electrode 22. For example, each second electrode 22 is configured to be connected to a reference voltage.

Figure 5A:
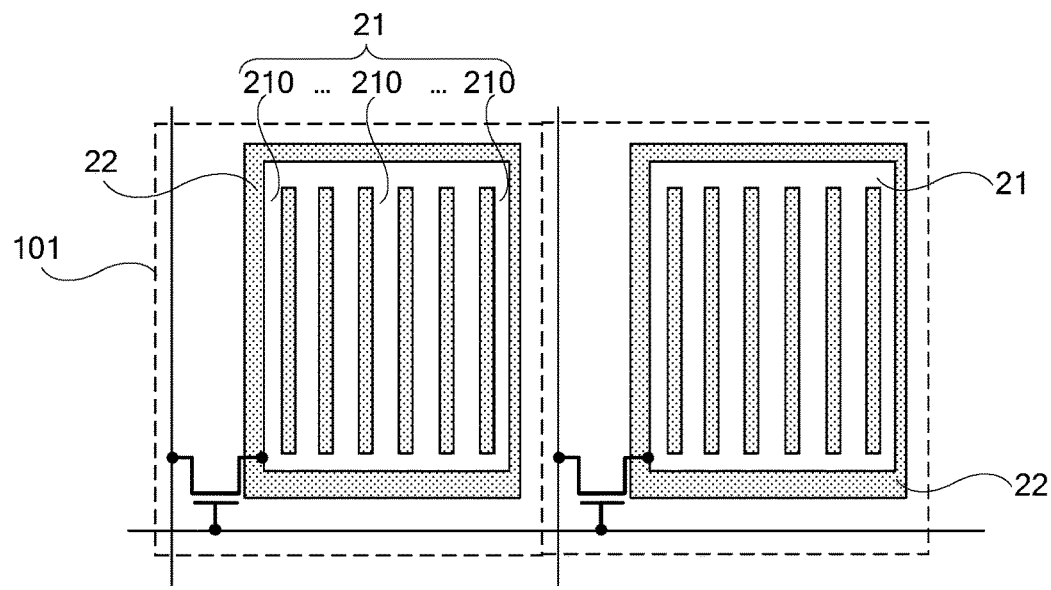
FIG. 5a is a schematic diagram of a control electrode layer, according to some embodiments of the present disclosure.

In some examples, as shown in FIG. 5a, the display panel 01 further includes a plurality of sub-pixels 101 disposed in the display area AA and arranged in an array. A set of first electrode 21 and second electrode 22, i.e., one first electrode 21 and one second electrode 22, are correspondingly provided in each sub-pixel 101. Each first electrode 21 includes a plurality of first sub-electrodes 210 spaced apart and electrically connected. First electrodes 21 between different sub-pixels are insulated from each other.

Figure 6:
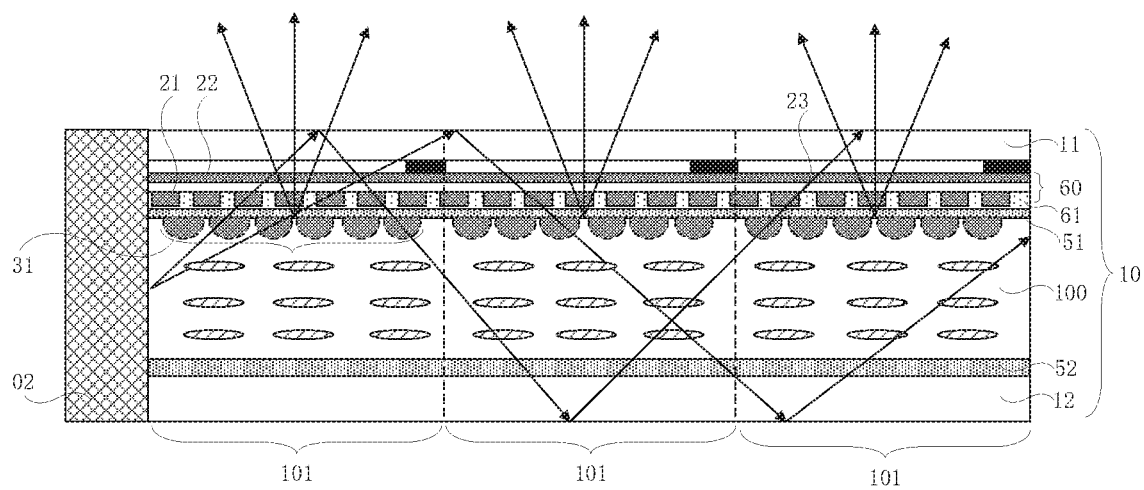
FIG. 6 is a schematic diagram showing propagation of light in an optical waveguide of another display panel, according to some embodiments of the present disclosure.

In addition, as shown in FIG. 6, in a case where voltages are applied to the control electrode layer 60 (i.e., each first electrode 21 and each second electrode 22), one liquid crystal sub-grating 31 (i.e., a portion of the liquid crystal grating 30 located in each sub-pixel 101) is formed in each sub-pixel 101. In this way, voltages applied to the first electrode 21 and the second electrode 22 corresponding to each sub-pixel 101 may be separately adjusted, so that the diffraction capability of the liquid crystal sub-grating 31 in each sub-pixel 101 may be controlled separately, and further each sub-pixel 101 may display a grayscale with a preset value as required.

Based on this, arrangement manners of the first electrodes 21 and the second electrodes 22 in the control electrode layer 60 are described in detail below with examples.

In some examples, the second electrode 22 corresponding to each sub-pixel 101 is in a block shape. In this case, the plurality of second electrodes 22 are insulated from each other or have an integrated structure.

For example, as shown in FIG. 5a, every two adjacent second electrodes 22 are spaced apart.

Figure 5B:
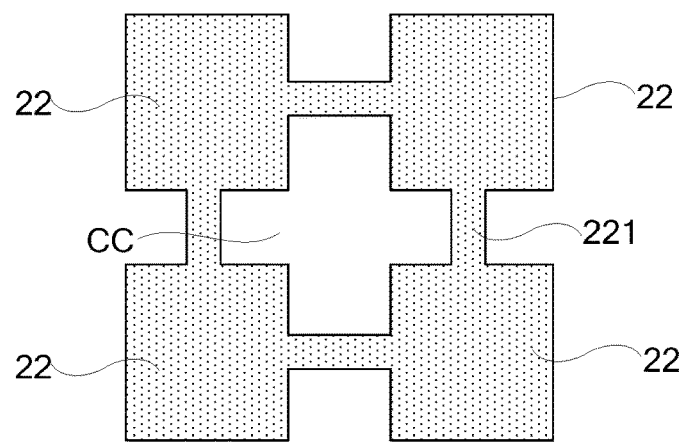
FIG. 5b is a schematic diagram of second electrodes, according to some embodiments of the present disclosure.

For another example, as shown in FIG. 5b, every two adjacent second electrodes 22 are electrically connected through a connection portion 221, and the connection portion 221 has a linear structure and has a small area. In this case, there is a hollow region CC between multiple adjacent second electrodes 22.

Figure 5C:
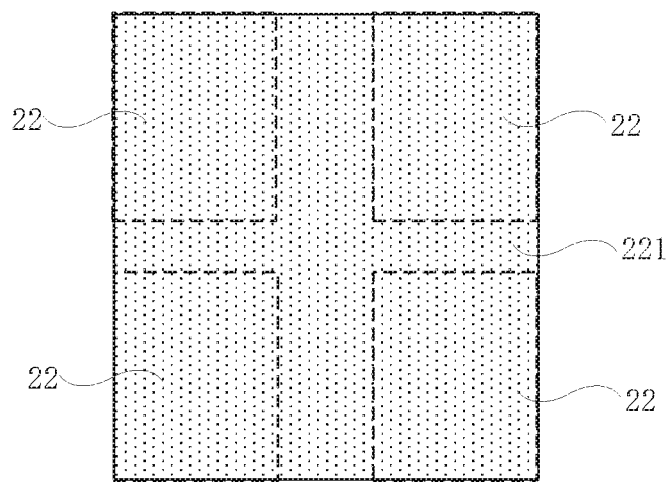
FIG. 5c is a schematic diagram of other second electrodes, according to some embodiments of the present disclosure.

For yet another example, as shown in FIG. 5c, every two adjacent second electrodes 22 are electrically connected through a connection portion 221, and the connection portion 221 has a planar structure and has a large area. In this case, there is no hollow region between multiple adjacent second electrodes 22, and the plurality of second electrodes 22 having an integrated structure in the display area AA constitute a whole electrode layer, and the whole electrode layer is in at least the display area AA of the display panel 01.

In addition, the connection portion 221 and the second electrode 22 are made of a same material and disposed in a same layer. That is, the connection portions 221 and the second electrodes 22 may be formed in a single patterning process. Some embodiments of the present disclosure do not limit the arrangement manner in which the second electrodes 22 have an integrated structure.

In some examples, the first electrodes 21 and the second electrodes 22 are disposed above a same substrate. For example, as shown in FIG. 6, the first electrodes 21 and the second electrodes 22 are all formed above the first substrate 11, and there is at least one insulating layer 23 between the second electrodes 22 and the first electrodes 21. In this case, in a same plane, parallel electric fields are generated at edges of the first sub-electrodes 210 in each first electrode 21, and a longitudinal electric field is generated between each first electrode 21 and a corresponding second electrode 22 that are both located above the first substrate 11. A multi-dimensional electric field composed of the parallel electric field and the longitudinal electric field may drive the corresponding liquid crystal molecules in the liquid crystal layer 100 to turn over, thereby forming the liquid crystal grating 30.

Figure 7:
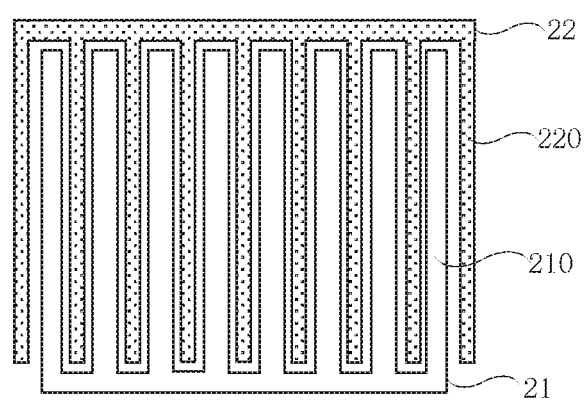
FIG. 7 is a schematic diagram of another control electrode layer, according to some embodiments of the present disclosure.

In addition, in some other examples, the arrangement manners of the first electrodes 21 and the second electrodes 22 may also be disposed in a same layer and in an insulating manner, as shown in FIG. 7.

The first electrodes 21 and the second electrodes 22 are both manufactured above the first substrate 11. As shown in FIG. 7, the first electrode 21 in each sub-pixel 101 includes a plurality of first sub-electrodes 210 spaced apart and electrically connected, and the second electrode 22 in each sub-pixel 101 includes a plurality of second sub-electrodes 220 spaced apart and electrically connected. In a same sub-pixel 101, one second sub-electrode 220 is spaced from one first sub-electrode 210 in a direction parallel to the first substrate 11. In this case, parallel electric fields, which are respectively generated between two adjacent first sub-electrodes 210 in each first electrode 21, between two adjacent second sub-electrodes 220 in each second electrode 22, and between each adjacent first sub-electrode 210 and second sub-electrode 220, may drive the liquid crystal molecules in the liquid crystal layer 100 to turn over, thereby forming the liquid crystal grating 30.

Figure 14:
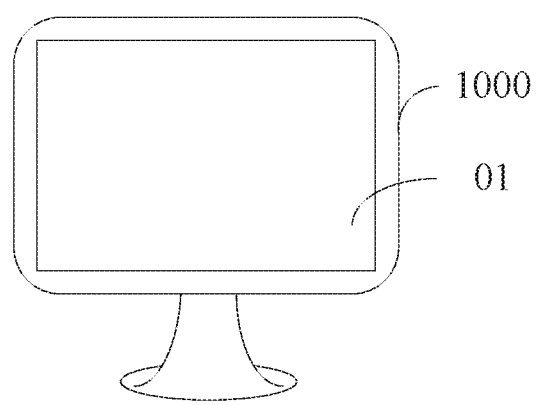
FIG. 14 is a schematic diagram of a display apparatus, according to some embodiments of the present disclosure.

Referring to FIGS. 8, 9 and 14, some embodiments of the present disclosure provide a display apparatus 1000 including any one of the display panels as described above.

The display apparatus 1000 further includes a light source 02 disposed at a light incident surface of the display panel 01 parallel to a thickness direction thereof. The light source 02 is configured to provide incident light incident into the optical waveguide 10, i.e., the liquid crystal layer 100 of the display panel 01. The refraction angle α of the incident light incident into the liquid crystal layer 100 is in a range of ($\theta_0$-90°, 90°-$\theta_0$), where $\theta_0$ is a total reflection critical angle of a total reflection interface corresponding to the totally-reflected light in the liquid crystal layer 100.

The display apparatus is any product or component having a display function such as a display, a television, a digital photo frame, a mobile phone, or a tablet computer. The display apparatus has the same technical effects as the display panel 01 provided in some of the aforementioned embodiments, and details are not described herein again.

In some embodiments, a light-emitting surface of the light source 02 covers at least a light incident surface of the liquid crystal layer 100 in the optical waveguide 10 of the display panel 01.

For example, an area of the light-emitting surface of the light source 02 is the same as an area of the light incident surface of the optical waveguide 10.

For example, as shown in FIG. 1, the optical waveguide 10 includes the insulating planarization layer 61, the liquid crystal layer 100, and the second substrate 12. The light-emitting surface of the light source 02 covers exactly the corresponding side surfaces (i.e., parts of the light incident surface) of the insulating planarization layer 61, the liquid crystal layer 100, and the second substrate 12 in a thickness direction thereof.

Or, for another example, as shown in FIG. 4, the optical waveguide 10 includes the first substrate 11, the control electrode layer 60, the insulating planarization layer 61, the first alignment layer 51, the liquid crystal layer 100, the second alignment layer 52, and the second substrate 12. The light-emitting surface of the light source 02 exactly covers the corresponding side surfaces (i.e., parts of the light incident surface) of the first substrate 11, the control electrode layer 60, the insulating planarization layer 61, the first alignment layer 51, the liquid crystal layer 100, the second alignment layer 52, and the second substrate 12 in a thickness direction thereof. In this way, an incident rate of the light from the light source 02 incident into the optical waveguide 10 may be increased.

Or, for yet another example, with continued reference to FIG. 4, the display apparatus 1000 further includes the transparent cover plate 62 disposed at the light-emitting side of the display panel 01. The optical waveguide 10 includes the first substrate 11, the control electrode layer 60, the insulating planarization layer 61, the liquid crystal layer 100, the second substrate 12, and air buffer(s) 63 on surface(s) of at least one of the first substrate 11 or the second substrate 12 away from the liquid crystal layer 100. In this way, the light-emitting surface of the light source 02 exactly covers the corresponding side surfaces (i.e., parts of the light incident surface) of the first substrate 11, the control electrode layer 60, the insulating planarization layer 61, the first alignment layer 51, the liquid crystal layer 100, the second alignment layer 52, and the second substrate 12 in the optical waveguide 10 in a thickness direction thereof. As shown in FIG. 4, there is an air buffer 63 between the transparent cover plate 62 and the first substrate 11 in the display panel 01.

Of course, in some examples, two opposite side surfaces of the display panel 01 are light incident surfaces of the display panel 01 in its thickness direction respectively, and each of the two side surfaces is provided with a light source 02. In this way, the light loss due to the coupling-out of light during propagation of light in the optical waveguide 10 including the liquid crystal layer 100, thereby avoiding reducing image quality displayed by the display panel 01.

In the following, some implementations adopted by the display apparatus 1000 in the process of color display are exemplified.

In some embodiments, the light source 02 is a white light source configured to emit white light. A plurality of sub-pixels 101 are provided in a display area AA of the display panel 01.

As shown in FIG. 8, the display panel 01 further includes a color filter layer 40 disposed on the first substrate 11 and located at a side of the control electrode layer 60 away from the liquid crystal layer 100. The color filter layer 40 includes a plurality of filter units 401. There is a filter unit 401 in each sub-pixel 101.

For example, the color filter layer 40 is disposed on a surface of the first substrate 11 proximate to the control electrode layer 60. In a case where the optical waveguide 10 includes the first substrate 11, the optical waveguide 10 further includes the color filter layer 40.

For example, at least three adjacent sub-pixels 101 constitute a pixel. The filter units 401 in different sub-pixels 101 of a same pixel may be different or the same, which is not limited in some embodiments of the present disclosure. In an example where three sub-pixels 101 are provided in a same pixel and the filter units 401 in the three sub-pixels 101 are different, a red (R) filter unit 401, a green (G) filter unit 401, and a blue (B) filter unit 401 are respectively provided in the three sub-pixels 101 of the pixel.

In this way, in a case where the display apparatus 1000 is in the dark state, the first electrode 21 and the second electrode 22 corresponding to each sub-pixel 101 receive the invalid electrical signals or no voltage is applied to the first electrode 21 and the second electrode 22, so as to ensure that the refraction angle of the incident light incident from the light source 02 into the optical waveguide 10 including the liquid crystal layer 100 satisfies the condition that the incident light is totally reflected in the optical waveguide 10. As a result, the incident light is totally reflected on the total reflection interfaces in the optical waveguide 10, so that it is ensured that the incident light incident into the optical waveguide 10 cannot be emitted from the optical waveguide 10 to avoid a light leakage of the display apparatus 1000 in the dark state.

In addition, in the process of displaying an image by the display apparatus 1000, according to the grayscales with values (except grayscale value 0) required to be displayed by the sub-pixels 101, voltages are applied respectively to the first electrodes 21 and the second electrodes 22 corresponding to different sub-pixels 101. In this way, one liquid crystal sub-grating 31 can be formed in each sub-pixel 101 that does not display a grayscale with value 0, and under diffraction action of the liquid crystal sub-grating 31, the light in the optical waveguide 10 is controlled to be coupled out according to diffraction capabilities of the liquid crystal sub-gratings 31.

Of course, the light diffracted by the liquid crystal sub-grating 31 in each sub-pixel 101 is one of red light, green light, or blue light through the color filtering of the corresponding color filter unit 401, thereby achieving color display.

In some other embodiments, the light source 02 is a white light source and configured to emit white light. A plurality of sub-pixels 101 are provided in the display area AA of the display panel 01, and each sub-pixel 101 is a sub-pixel with a color. At least three adjacent sub-pixels 101 constitute a pixel.

As shown in FIG. 9, the number of the first sub-electrodes 210 in different sub-pixels 101 in the same pixel is different. In this way, by adjusting the number of the first sub-electrodes 210 in the first electrode 21 in each sub-pixel 101, that is, by adjusting a width of each first sub-electrode 210 in the first electrode 21 and a distance between two adjacent first sub-electrodes 210, different sub-pixels 101 in the same pixel are able to diffract lights with different wavelengths in a fixed emission direction, thereby achieving color display.

For example, a wavelength λ of light that each sub-pixel 101 is able to emit satisfies the following formula:

$$n_1 \sin\theta_1 - n_2 \sin\theta_2 = m \times \lambda / \Lambda \qquad (2)$$

where $\theta_1$ is an incident angle of the totally-reflected light (i.e., the light in the optical waveguide 10) incident into a corresponding total reflection interface; $n_1$ is a refractive index of an optically denser medium (that is, a first medium in which the light incident onto the total reflection interface is located in the optical waveguide 10) corresponding to the total reflection interface, $n_2$ is a refractive index of an optically thinner medium (that is, a second medium in the optical waveguide 10 that is adjacent to the first medium to form the total reflection interface) corresponding to the total reflection interface, and $n_1$ is greater than $n_2$ ($n_1 > n_2$); m is a diffraction order of the liquid crystal sub-grating 31 corresponding to each sub-pixel 101; $\Lambda$ is a period of the liquid crystal sub-grating 31 corresponding to each sub-pixel 101; and $\theta_2$ is a light-emitting angle corresponding to each sub-pixel 101.

In an example where the optical waveguide 10 includes the first substrate 11, the control electrode layer 60, the insulating planarization layer 61, the first alignment layer 51, the liquid crystal layer 100, the second alignment layer 52, the second substrate 12, and air buffers 63 located on surfaces of the first substrate 11 and the second substrate 12 away from the liquid crystal layer 100, the total reflection interfaces corresponding to the totally-reflected light in the optical waveguide 10 includes a first total reflection interface where the first substrate 11 is in contact with its corresponding air buffer 63, and a second total reflection interface where the second substrate 12 is in contact with its corresponding air buffer 63. In this way, a refractive index $n_1$ of the first medium (i.e., an optically denser medium) in which the light incident into the first total reflection interface in the optical waveguide 10 is located is the refractive index of the first substrate 11, and a refractive index $n_2$ of the second medium (i.e., an optically thinner medium) that is adjacent to the first substrate 11 to form the first total reflection interface in the optical waveguide 10 is the refractive index of the air buffer 63 in contact with the first substrate 11. A refractive index $n_1$ of the first medium (i.e., an optically denser medium) in which the light incident into the second total reflection interface in the optical waveguide 10 is located is the refractive index of the second substrate 12, and a refractive index $n_2$ of the second medium (i.e., an optically thinner medium) that is adjacent to the second substrate 12 to form the second total reflection interface in the optical waveguide 10 is the refractive index of the air buffer 63 in contact with the second substrate 12. In a case where the first substrate 11 and the second substrate 12 have a same refractive index, the first total reflection interface and the second total reflection interface have a same total reflection critical angle.

In this case, for a near-eye display apparatus, since a display panel of the near-eye display apparatus is very close to the user's eyes, the user's eyes generally only receive the light emitted from a certain angle. In addition, for a virtual reality (VR) display apparatus or an augmented reality (AR) display apparatus, a light emission direction of any sub-pixel in the display panel 01 of the display apparatus is fixed. Therefore, in the process of designing and manufacturing the display panel 01, the light emission directions of the sub-pixels 101 in the display panel 01 may be designed through optical simulation software, so as to obtain the light-emitting angle $\theta_2$ corresponding to each sub-pixels 101 in formula (2) (that is, an angle between a direction of the diffracted light corresponding to the liquid crystal sub-grating 31 in each sub-pixel 101 and a normal to a plane on which the light-emitting surface of the display panel 01 is located).

It will be seen that in formula (2), the incidence angle $\theta_1$ of the light in the optical waveguide 10 incident onto its total reflection interface, the refractive index $n_1$ of the first medium in which the light incident onto the total reflection surface in the optical waveguide 10 is located, the refractive index $n_2$ of the second medium in the optical waveguide 10 that is adjacent to the first medium to form a total reflection interface, the light-emitting angle $\theta_2$ corresponding to each sub-pixel 101, and the diffraction order m of the liquid crystal sub-grating 31 corresponding to each sub-pixel 101 are all known.

In addition, by adjusting the number of the first sub-electrodes 210 of the first electrode 21 in each sub-pixel 101, the period $\Lambda$ of the corresponding liquid crystal sub-grating 31 in the sub-pixel 101 may be adjusted, and further the wavelength λ of the diffracted light corresponding to the liquid crystal sub-grating 31 may be adjusted.

Therefore, after the number of the first sub-electrodes 210 of the first electrode 21 in each sub-pixel 101 is determined, each sub-pixel 101 in the display panel 01 can emit light with a predetermined wavelength in a given direction (that is, the light-emitting angle $\theta_2$ corresponding to each sub-pixel 101 or the light-emitting direction of the diffracted light of the liquid crystal sub-grating 31 corresponding to each sub-pixel 101), thereby achieving color display. Here, each sub-pixel 101 may or not be provided with a filter unit 401 with a color corresponding to the color of the monochromatic light emitted by the sub-pixel 101, which is not limited in some embodiments of the present application.

In addition, as will be seen from formula (2), a wavelength λ of the monochromatic light emitted by each sub-pixel 101 is proportional to the period $\Lambda$ of the liquid crystal sub-grating 31 in the sub-pixel 101. The period $\Lambda$ of each liquid crystal sub-grating 31 is inversely proportional to the number of the first sub-electrodes 210 in the first electrode 21 of the corresponding sub-pixel 101. Therefore, in a case where the plurality of sub-pixels 101 in the display area AA include sub-pixels 101 configured to emit monochromatic lights with different wavelengths, the wavelength λ of the monochromatic light emitted by each sub-pixel 101 is inversely proportional to the number of corresponding first sub-electrodes 210 in the sub-pixel 101.

In some examples, the sub-pixels 101 emitting monochromatic lights with different wavelengths include: sub-pixels emitting red light (R), sub-pixels emitting green light (G), and sub-pixels emitting blue light (B). The wavelength $\lambda_R$ of the red light (R) is in a range from 622 nm to 760 nm, the wavelength $\lambda_G$ of the green light (G) is in a range from 492 nm to 577 nm, and the wavelength $\lambda_B$ of the blue light (B) is in a range from 435 nm to 450 nm. That is, $\lambda_R$ is greater than $\lambda_G$, and $\lambda_G$ is greater than $\lambda_B$ ($\lambda_R > \lambda_G > \lambda_B$). Therefore, as will be seen from formula (2), the period $\Lambda_R$ of the liquid crystal sub-grating 31 in each sub-pixel 101 emitting red light (R), the period $\Lambda_G$ of the liquid crystal sub-grating 31 in each sub-pixel 101 emitting green light (G), and the period $\Lambda_B$ of the liquid crystal sub-grating 31 in each sub-pixel 101 emitting blue light (B), satisfy the following relationship: $\Lambda_R$ is greater than $\Lambda_G$, and $\Lambda_G$ is greater than $\Lambda_B$ ($\Lambda_R > \Lambda_G > \Lambda_B$).

As will be known from the above, the period $\Lambda$ of each liquid crystal sub-grating 30 is inversely proportional to the number of the first sub-electrodes 210 in the sub-pixel 101 corresponding to the liquid crystal sub-grating 30. Therefore, as shown in FIG. 9, the number of first sub-electrodes 210 in each sub-pixel 101 configured to emit red light (R) is less than the number of first sub-electrodes 210 in each sub-pixel 101 configured to emit green light (G); and the number of first sub-electrodes 210 in each sub-pixel 101 configured to emit green light (G) is less than the number of first sub-electrodes 210 in each sub-pixel 101 configured to emit blue light (B).

The above description is only made by taking as an example that the display panel 01 includes three types of sub-pixels 101 configured to emit red light (R), green light (G), and blue light (B). In a case where the display panel 01 further includes at least one type of sub-pixels 101 configured to emit light with other colors, the number of the first sub-electrodes 210 of each sub-pixel 101 in the at least one type of sub-pixels 101 may refer to the above arrangement process, which will not be described herein again.

In summary, in the color display scheme provided by some embodiments of the present disclosure, a normal color display can be achieved only when the light-emitting angle corresponding to each sub-pixel 101 in the display panel 01 is determined. Therefore, the scheme is suitable for a near-eye display and a display of application scenarios such as VR or AR.

Some embodiments of the present disclosure provide a method of controlling the display apparatus. As shown in FIG. 10, the method of controlling the display apparatus includes step 101 to step 102 (S101~S102).

In S101, the light source 02 is controlled to provide incident light to the liquid crystal layer 100 of the display panel 01, and a refraction angle α of the incident light incident into the liquid crystal layer 100 is in a range of ($\theta_0$-90°, 90°-$\theta_0$), where $\theta_0$ is a total reflection critical angle of a total reflection interface corresponding to the totally-reflected light in the liquid crystal layer 100.

In S102, voltages are applied to the control electrode layer 60 to control the incident light to propagate through total reflection in the liquid crystal layer 100, and to drive liquid crystal molecules in the liquid crystal layer to form a liquid crystal grating 30 to make the totally-reflected light in the liquid crystal layer 100 coupled out at a side of the first substrate 11.

Here, if the voltages applied to the control electrode layer 60 are invalid electrical signals (e.g., null signals), that is, the control electrode layer 60 is not able to generate an electric field after receiving the invalid electrical signals, the light incident into the liquid crystal layer 100 may be totally reflected in the optical waveguide 10 where the liquid crystal layer 100 is located. The liquid crystal layer 100 is a component of the optical waveguide 10, and the liquid crystal layer 100 is in a dark state without an electric field.

If the voltages applied to the control electrode layer 60 are effective electrical signals (e.g., a plurality of electrical signals having voltage differences), the control electrode layer 60 generates a plurality of electric fields after receiving the effective electrical signals, so as to form a liquid crystal grating 30 in the liquid crystal layer 100.

Based on this, in a case where the display panel 01 includes a plurality of sub-pixels 101 arranged in an array, the control electrode layer 60 includes a plurality of first electrodes 21, and each first electrodes 21 is located in a corresponding sub-pixel 101. The liquid crystal grating 30 includes a plurality of liquid crystal sub-gratings 31 in one-to-one correspondence with the sub-pixels 101. The liquid crystal sub-gratings 31 formed in some sub-pixels 101 that are proximate to the light source 02 may receive more light, and the liquid crystal sub-gratings 31 formed in some sub-pixels 101 that are farther away from the light source 02 may receive slightly less light.

In S102, the step of forming a liquid crystal grating 30 to make the totally-reflected light in the liquid crystal layer 100 coupled out at a side of the first substrate 11, further includes: applying a voltage to each first electrode 21 to control a light intensity of diffracted light of the liquid crystal sub-grating 31 corresponding to each sub-pixel 101 to be 0.1% to 20% of a light intensity of the incident light.

In this way, a part of the incident light received by the liquid crystal sub-grating 31 can be diffracted out of the optical waveguide 10 by utilizing the liquid crystal sub-grating 31 corresponding to each sub-pixel 101. In this case, another part of the incident light that can be received by each liquid crystal sub-grating 31 can continue to propagate in the optical waveguide 10, such that the light loss during the propagation of the light in the optical waveguide 10 may be compensated. Thereby, the amount of light that can be received by each liquid crystal sub-grating 31 in some of the sub-pixels 101 farther from the light source 02 is increased. And further it is ensured that a luminance of the light coupled out by the liquid crystal sub-gratings 31 in some sub-pixels 101 proximate to the light source 02 tends to be consistent with a luminance of the light coupled out by the liquid-crystal sub-gratings 31 in some sub-pixels 101 farther from the light source 02, so as to improve the uniformity of the display luminance of the entire display panel 01.

It will be noted that, in order to make the light intensity of the diffracted light of each liquid crystal sub-grating 31 be 0.1% to 20% of the light intensity of the incident light of the liquid crystal sub-grating 31, voltages applied to the first electrode 21 and the second electrode 22 corresponding to the control electrode layer 60 may be adjusted several times to obtain an electric field such that the light intensity of the diffracted light of each liquid crystal sub-grating 31 meet the above conditions.

In some embodiments of the present disclosure, the light intensity of the diffracted light of the liquid crystal sub-grating 31 in each sub-pixel 101 is controlled to be 0.1% to 20% of the light intensity of the incident light of the liquid crystal sub-grating 31 in each sub-pixel 101. In this way, not only can the amount of light emitted by the sub-pixel corresponding to each liquid crystal sub-grating 31 be prevented from being too small, which causes the display luminance of the display panel 01 to be too low, but also the light loss of the light in the optical waveguide 10 caused by the propagation process can be reduced on the premise of ensuring that the sub-pixel corresponding to each liquid crystal sub-grating 31 has an emission luminance meeting the requirements. Thereby the uniformity of the emission luminance of the entire display panel 01 is improved.

In some embodiments, the control electrode layer 60 includes a plurality of first electrodes 21 and a plurality of second electrodes 22. One first electrode 21 and one second electrode 22 are provided in each sub-pixel 101. In S102, applying voltages to the control electrode layer 60 further includes: applying a same voltage to the first electrode 21 in each sub-pixel 101 displaying a same grayscale, and applying a same voltage to the second electrode 22 in each sub-pixel 101 displaying a same grayscale. In this way, the light intensity of the diffracted light of the liquid crystal sub-grating 31 in each sub-pixel 101 displaying the same grayscale is the same, thereby ensuring that the display luminance of the sub-pixels 101 displaying the same grayscale in the display panel 01 is the same.

Figure 11:
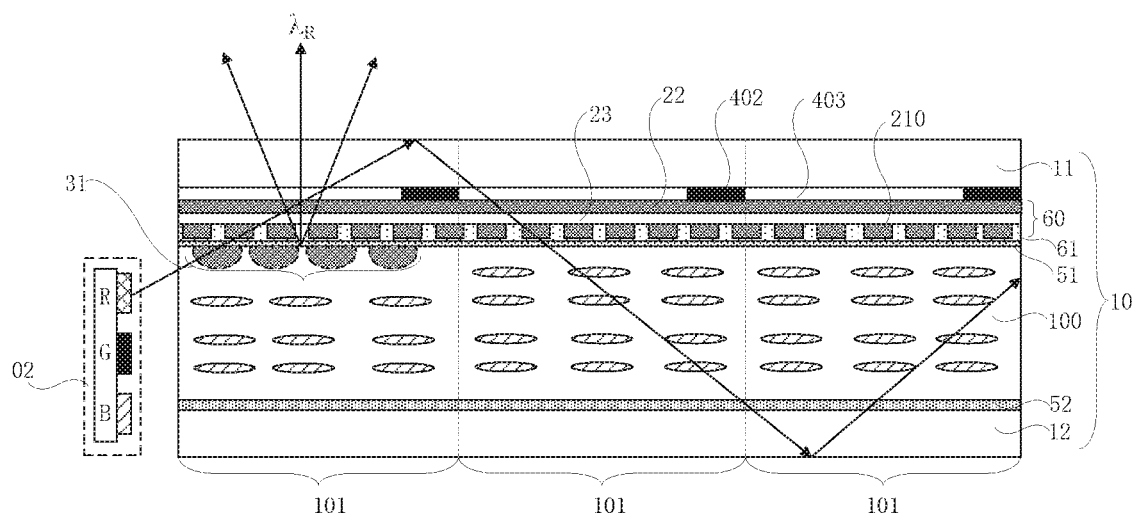
FIG. 11 is a schematic diagram showing a color display achieved by inputting light from a red sub-light source among the light sources of three primary colors in a different time period, according to some embodiments of the present disclosure.

Based on the method of controlling the display apparatus, in yet some other embodiments, as shown in FIG. 11, the light source 02 includes a plurality of monochromatic sub-light sources with different colors, which are configured to emit a variety of monochromatic lights with different colors in a different time period. The display panel 01 includes a plurality of sub-pixels 101. In S101, the step of controlling the light source 02 to provide incident light to the liquid crystal layer 100 further includes: in a time of a single frame, controlling a plurality of monochromatic sub-light sources with different colors to sequentially emit monochromatic lights with different colors in a different time period. For example, the light source 02 sequentially emits three primary color lights, i.e., red (R), green (G), and blue (B) primary color lights, and monochromatic lights with different colors emitted by the light source 02 in a time of a single frame can be mixed into white light.

Figure 12:
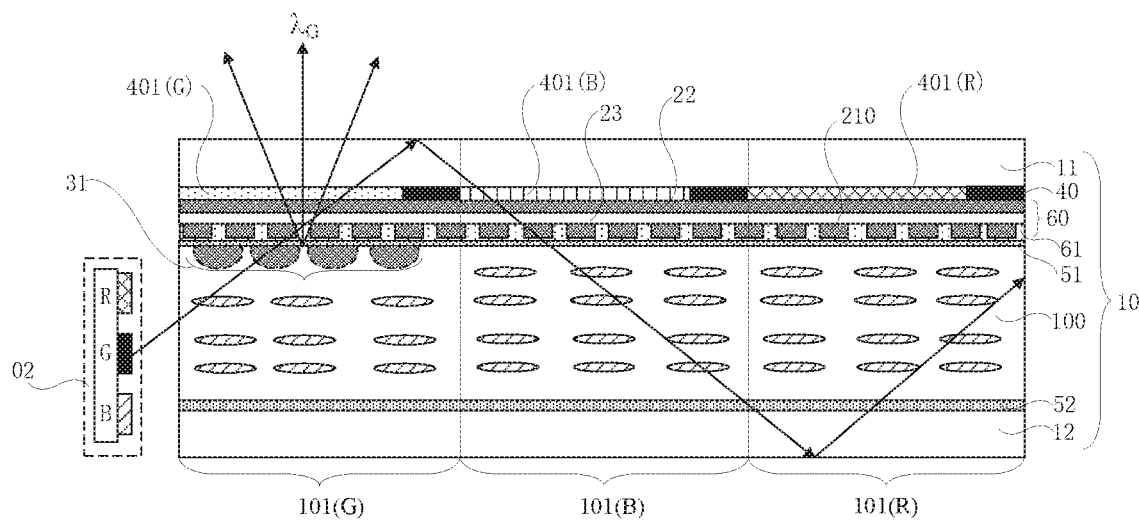
FIG. 12 is a schematic diagram showing a color display achieved by inputting light from a green sub-light source among the light source of three primary colors in a different time period, according to some embodiments of the present disclosure.
Figure 13:
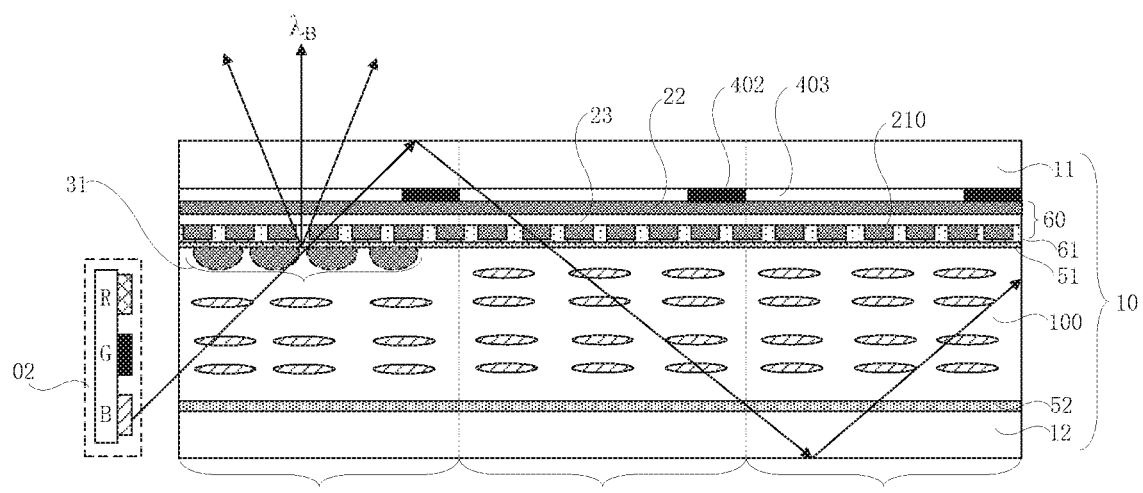
FIG. 13 is a schematic diagram showing a color display achieved by inputting light from a blue sub-light source among the light source of three primary colors in a different time period, according to some embodiments of the present disclosure.

For example, the light source 02 includes a variety of sub-light sources arranged in a dot matrix, such as red (R), green (G), and blue (B) sub-light sources arranged in a dot matrix, in which the sub-light sources arranged in a dot matrix of each color are driven in a different time period. For example, in a first time period in a time of a single frame, as shown in FIG. 11, the R sub-light sources arranged in a dot matrix emit light, and then, in a second time period in the time of a single frame, as shown in FIG. 12, the G sub-light sources arranged in a dot matrix emit light, and finally, in a third time period in the time of a single frame, as shown in FIG. 13, the B sub-light sources arranged in a dot matrix emit light.

Correspondingly, after a corresponding liquid crystal sub-grating 31 is formed in each sub-pixel 101, in the above S102, the step of making the totally reflected light in the liquid crystal layer 100 coupled out at a side of the first substrate 11, further includes: in a time of a single frame, controlling the monochromatic lights with different colors incident into the liquid crystal layer 100 to be sequentially coupled out at a position of each sub-pixel 101.

Here, each sub-pixel 101 is a sub-pixel with a color (that is, a filter unit 401 with a color corresponding to the color of the sub-pixel is provided in the sub-pixel 101), or a sub-pixel without a color (that is, no filter unit 401 with a color is provided in the sub-pixel 101).

In some examples, as shown in FIG. 11, each sub-pixel 101 is a sub-pixel without a color, and a part of a black matrix 402 and a light-transmittable planarization portion 403 provided in a same layer and with a same thickness as the black matrix 402 are disposed in each sub-pixel 101. In some embodiments of the present disclosure, in a time of a single frame, the monochromatic lights with different colors incident into the liquid crystal layer 100 can be controlled to be sequentially coupled out at the position of each sub-pixel 101 by utilizing a variety of monochromatic lights with different colors emitted by the light source 02 in a different time period and the liquid crystal sub-grating 31 formed in each sub-pixel 101. That is, in each frame, each sub-pixel 101 is used as sub-pixels with different colors in a different time period. Thereby, light received by the user's eyes is equivalent to light obtained by superposing and mixing the monochromatic lights with different colors emitted by each sub-pixel 101 in the time of a single frame, that is, the user can view a color image. In this way, each sub-pixel 101 may emit light with a plurality of colors in the time of a single frame, thereby ensuring the display panel 01 to achieve color display and effectively improving the resolution of the display panel 01. Based on this, optionally, in the time of a single frame, each monochromatic light in the monochromatic lights with different colors emitted by the light source 02 has a same light-emitting duration, so that each sub-pixel 101 may uniformly mix the light with different colors emitted by the light source 02 in the time of a single frame.

Of course, based on this, in another example, by controlling the voltages applied to the corresponding first electrode 21 and second electrode 22 in each sub-pixel 101, each sub-pixel 101 is caused to selectively emit one or more types of monochromatic lights in the time of a single frame.

In yet some other examples, as shown in FIG. 12, each sub-pixel 101 is a sub-pixel with a color, that is, a filter unit 401 with a color corresponding to the color of the sub-pixel is provided in each sub-pixel 101. In some embodiments of the present disclosure, a variety of monochromatic lights with different colors emitted by the light source 02 in a different time period and a liquid crystal sub-grating 31 formed in each sub-pixel 101 are utilized to control the monochromatic lights with different colors incident into the liquid crystal layer 100 to be sequentially coupled out at a position of the sub-pixel 101 with a color corresponding to the color of the monochromatic light in a time of a single frame. That is, the sub-pixels 101 in each pixel emit monochromatic lights with different colors in a different time period. Thereby, light received by the user's eyes is equivalent to light obtained can by superposing and mixing the monochromatic lights with different colors emitted by each sub-pixel 101 in the time of a single frame, that is, the user can view a color image.

The method of controlling the display apparatus described in some embodiments of the present disclosure may be implemented by executing instructions. The instructions may be executed by one or more processors, which may be stored in a random access memory (RAM), a flash memory, a read only memory (ROM), an erasable programmable ROM (EPROM), an electrically EPROM (EEPROM), a register, a hard disk, a mobile hard disk, a compact disc read only memory (CD-ROM) or any other forms of storage media well known in the art.

Based on this, some embodiments of the present disclosure provide a computer product including one or more processors configured to execute computer instructions, so as to perform one or more steps in the method of controlling the display apparatus as described in some embodiments above.

Some embodiments of the present disclosure provide a non-transitory computer-readable storage medium storing computer instructions that, when executed by a display apparatus, cause the display apparatus to perform the method of controlling the display apparatus as described in some embodiments above.

Some embodiments of the present disclosure provide a computer program that, when loaded into a processor, causes the processor to perform the method of controlling the display apparatus as described in some embodiments above.

Those skilled in the art will appreciate that, in one or more examples described above, the functions described may be implemented in hardware, software, firmware or any combination thereof. When implemented in software, the functions may be stored in or transmitted over as one or more instructions or code in a computer-readable medium. The computer-readable medium includes a computer storage medium and a communication medium including any medium that facilitates transfer of a computer program from one place to another. The storage medium may be any available medium that may be accessed by a general-purpose or special-purpose computer.

In the above description of the embodiments, specific features, structures, materials or characteristics may be combined in any suitable manner in any one or more embodiments or examples.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display panel, comprising:
    a liquid crystal layer;
    a first substrate and a second substrate disposed at opposite sides of the liquid crystal layer; and
    a control electrode layer disposed above the first substrate, the control electrode layer being configured to receive electrical signals to control light incident into the liquid crystal layer to propagate through total reflection, and to drive liquid crystal molecules in the liquid crystal layer to form a liquid crystal grating to make totally-reflected light in the liquid crystal layer coupled out at a side of the first substrate.

2. The display panel according to claim 1, wherein the control electrode layer includes a plurality of first electrodes and a plurality of second electrodes, and the plurality of first electrodes and the plurality of second electrodes are insulated from each other; and
    the display panel further comprises a plurality of sub-pixels arranged in an array, wherein one first electrode is correspondingly provided in each sub-pixel; and each first electrode includes a plurality of first sub-electrodes spaced apart and electrically connected.

3. The display panel according to claim 2, wherein one second electrode is correspondingly provided in each sub-pixel; and each second electrode includes a plurality of second sub-electrodes spaced apart and electrically connected; and
    In a same sub-pixel, one second sub-electrode and one first sub-electrodes are spaced apart from each other in a direction parallel to the first substrate.

4. The display panel according to claim 2, wherein the plurality of sub-pixels include sub-pixels configured to be able to emit monochromatic lights with different wavelengths; and
    a wavelength of monochromatic light that each sub-pixel is able to emit is inversely proportional to a number of first sub-electrodes in the sub-pixel.

5. The display panel according to claim 4, wherein the sub-pixels configured to be able to emit monochromatic lights with different wavelengths include sub-pixels configured to be able to emit red light, sub-pixels configured to be able to emit green light, and sub-pixels configured to be able to emit blue light, wherein
    a number of first sub-electrodes in each sub-pixel that is configured to be able to emit red light is less than a number of first sub-electrodes in each sub-pixel that is configured to be able to emit green light; and the number of first sub-electrodes in each sub-pixel that is configured to be able to emit green light is less than a number of first sub-electrodes in each sub-pixel that is configured to be able to emit blue light.

6. The display panel according to claim 1, further comprising an insulating planarization layer disposed at a side of the control electrode layer proximate to the liquid crystal layer, wherein a refractive index of a material of the insulating planarization layer is equal to a refractive index of a material of the control electrode layer, and a shape of the insulating planarization layer is complementary to a shape of the control electrode layer so that a surface of the insulating planarization layer proximate to the liquid crystal layer is flat.

7. The display panel according to claim 6, further comprising:
    a first alignment layer disposed above the first substrate and located at a side of the insulating planarization layer proximate to the liquid crystal layer; and
    a second alignment layer disposed above the second substrate.

8. The display panel according to claim 6, wherein
    one total reflection interface corresponding to the totally-reflected light is between the liquid crystal layer and the first substrate, and another total reflection interface corresponding to the totally-reflected light is between the liquid crystal layer and the second substrate.

9. The display panel according to claim 6, wherein one total reflection interface corresponding to the totally-reflected light is between the liquid crystal layer and the insulating planarization layer, and another total reflection interface corresponding to the totally-reflected light is between the liquid crystal layer and the second substrate.

10. The display panel according to claim 6, wherein
    one total reflection interface corresponding to the totally-reflected light is at a side of the first substrate away from the liquid crystal layer, and another total reflection interface corresponding to the totally-reflected light is at a side of the second substrate away from the liquid crystal layer.

11. The display panel according to claim 7, further comprising a color filter layer disposed above the first substrate and located at a side of the control electrode layer away from the liquid crystal layer.

12. A display apparatus, comprising a light source and the display panel according to claim 1, wherein
    the light source is disposed at a light incident surface of the display panel parallel to a thickness direction;
    the light source is configured to provide incident light incident into the liquid crystal layer, and a refraction angle of the incident light incident into the liquid crystal layer is in a range of ($\theta_0$-90°, 90°-$\theta_0$), where $\theta_0$ is a total reflection critical angle of a total reflection interface corresponding to the totally-reflected light formed by the incident light.

13. The display apparatus according to claim 12, further comprising a transparent cover plate disposed at a light-emitting side of the display panel; and an air buffer disposed between the transparent cover plate and the first substrate in the display panel.

14. The display apparatus according to claim 12, wherein the light source includes at least three types of monochromatic sub-light sources with different colors.

15. The display apparatus according to claim 12, wherein the light source is a white light source;
    the display panel includes a plurality of sub-pixels with different colors; the liquid crystal grating in the display panel includes a plurality of liquid crystal sub-gratings; the plurality of liquid crystal sub-gratings are in one-to-one correspondence with the plurality of sub-pixels;
    a wavelength $\lambda$ of light that each sub-pixel is able to emit satisfies the following formula:

$n_1 \sin \theta_1 - n_2 \sin \theta_2 = m \times \lambda / \Lambda$, where $\theta_1$ is an incident angle at which the totally-reflected light is incident onto a corresponding total reflection interface; $n_1$ is a refractive index of an optically denser medium corresponding to the total reflection interface; $n_2$ is a refractive index of an optically thinner medium corresponding to the total reflection interface, and $n_1$ is greater than $n_2$; m is a diffraction order of a liquid crystal sub-grating corresponding to each sub-pixel; $\Lambda$ is a period of the liquid crystal sub-grating corresponding to each sub-pixel; and $\theta_2$ is a light-emitting angle corresponding to each sub-pixel.

16. A method of controlling the display apparatus according to claim 12, comprising:
controlling the light source to provide incident light to the liquid crystal layer, and the refraction angle of the incident light incident into the liquid crystal layer in the range of ($\theta_0$-90°, 90°-$\theta_0$), where $\theta_0$ is the total reflection critical angle of the total reflection interface corresponding to the totally-reflected light formed by the incident light; and
applying electrical signals to the control electrode layer to control the incident light to propagate in the liquid crystal layer through total reflection, and to drive the liquid crystal molecules in the liquid crystal layer to form the liquid crystal grating to make the totally-reflected light in the liquid crystal layer coupled out at a side of the first substrate.

17. The method of controlling the display apparatus according to claim 16, wherein the display panel includes a plurality of sub-pixels arranged in an array; the control electrode layer includes a plurality of first electrodes, each of which is located in a corresponding sub-pixel; the liquid crystal grating includes a plurality of liquid crystal sub-gratings in one-to-one correspondence with the plurality of sub-pixels;
forming the liquid crystal grating to make the totally-reflected light in the liquid crystal layer coupled out at a side of the first substrate, further includes:
applying an electrical signal to each first electrode to control a light intensity of diffracted light of a liquid crystal sub-grating corresponding to each sub-pixel to be 0.1% to 20% of a light intensity of the incident light.

18. The method of controlling the display apparatus according to claim 16, wherein the light source includes a plurality of monochrome sub-light sources with different colors, and the display panel includes a plurality of sub-pixels; and
controlling the light source to provide incident light to the liquid crystal layer, further includes:
in a time of a single frame, controlling the plurality of monochromatic sub-light sources with different colors to sequentially emit monochromatic lights with different colors in a different time period; and
making the totally-reflected light in the liquid crystal layer coupled out at a side of the first substrate, further includes:
in a time of a single frame, controlling the monochromatic lights with different colors incident into the liquid crystal layer to be sequentially coupled out at a position of each sub-pixel.

19. The method of controlling the display apparatus according to claim 18, wherein in the time of a single frame, all the monochromatic lights in the monochromatic lights with different colors have a same light-emitting duration.

20. A non-transitory computer-readable storage medium, wherein
the non-transitory computer-readable storage medium stores computer instructions that are configured to execute the method of controlling the display apparatus according to claim 16.

* * * * *